United States Patent Office 3,067,156
Patented Dec. 4, 1962

3,067,156
PARAFFIN WAX, OXIDIZED WAX, AND POLY-
ETHYLENE POLISHING COMPOSITION
Philip Leonard Branton, Downs View, Ontario, Canada,
assignor to Simoniz Company, a corporation of Delaware
No Drawing. Filed Feb. 5, 1959, Ser. No. 791,274
2 Claims. (Cl. 260—28.5)

This invention relates to a polishing composition.

The customary polishing compositions, and especially those adapted to be applied to floors to produce an attractive protective coating, have usually employed a hard wax ingredient in order to give the necessary brilliance and protection. This hard surfacing ingredient has customarily been a hard natural wax such as carnauba. Although this type of wax produces the desired result, various difficulties are encountered in the use of such a natural hard wax because the characteristics of successive batches often vary.

The polishing composition of this invention achieves high luster and protection to the surface to which it is applied yet uses a solid polyethylene which is a synthetic material in order to give the desired characteristics mentioned above. The polyethylene being a synthetic material does not vary materially in successive batches so that the production and final characteristics of the polishing composition are more closely controllable.

One of the features of this invention, therefore, is to provide a polishing composition and especially a paste polishing composition including solid polyethylene as the film forming ingredient to contribute to the formation of a hard, tough, wear resistant film of high gloss when the composition is applied to a surface such as a floor.

Other features and advantages of the invention will be apparent from the following description of certain embodiments thereof.

The polyethylene which is useful in the film forming agent of this invention is a waxy material. The preferred polyethylene is a solid polyethylene of the type produced by the Semet-Solway Division of Allied Chemical & Dye Corporation under the trade name A.C. Polyethylene No. 6. It is preferred that the polyethylene be present in the polishing composition of this invention in an amount from about 4 to 8% by weight of the composition, with about 6% by weight of the composition being most preferred.

The film forming agent of the polishing composition also includes other wax-like materials such as synthetic microcrystalline waxes and paraffin. The microcrystalline waxes are those derived from petroleum and are further characterized by the fineness of their crystals in distinction to the larger crystals of paraffin. They consist of saturated solid aliphatic hydrocarbons. A satisfactory microcrystalline wax is an oxidized microcrystalline wax produced under the trade name Crown 36 by Bareco Wax Division of Petrolite Corporation.

As mentioned above, paraffin is included in the film forming agent of the polishing composition to modify the properties of the film former. Here it acts as a softener.

The microcrystalline wax, and preferably oxidized microcrystalline wax, is used in the film forming agent of this invention in an amount of from about .5 to 2% by weight of the composition with the preferred amount being about 1% by weight of the composition. The paraffin is present in an amount from about 12 to 22% by weight of the composition with the preferred amount being about 16% by weight of the composition.

A volatile solvent for the film forming agent of the polishing composition is also included. The preferred solvents are hydrocarbon solvents and are those in which the film forming agent is freely soluble. For example, oleum spirits may be used satisfactorily as the solvent in the polishing composition of this invention and a satisfactory oleum spirits solvent is marketed by the Imperial Oil Co. under the trade name Varsol 3139. The solvent is included in the polishing composition of this invention in an amount of from about 70 to 81% by weight of the composition with the preferred amount being about 76% by weight of the composition. These amounts are insufficient to dissolve all of the film forming agents so that the product is in the form of a paste.

In one example of the manufacture of the polishing composition of this invention, 20 gallons of Varsol solvent were added to a 100 gallon kettle. Thereafter, 41 pounds 6 ounces of A.C. Polyethylene No. 6, 110 pounds 8 ounces of paraffin, and 8 pounds 4 ounces of Crown 36 oxidized microcrystalline wax were added. The temperature was raised to 220° F. and stirring was maintained until the solid material had dissolved. Then 34 more gallons of Varsol were added and the batch was cooled to 165° F., next 25¾ gallons of Varsol were added at a temperature of 68° F. causing the temperature of the batch to drop to 145° F. The polishing composition was then put up in cans. The optimum filling temperature during this operation being between about 137 to 135° F.

The color of the polishing composition of this invention may be varied according to desire. In order to do this, small amounts of oil dyes may be included. Preferable dye colors are black, yellow, brown and mixtures thereof.

The foregoing detailed description is given for clearness of understanding only and no unnecessary limitation should be understood therefrom as modification will be obvious to those skilled in the art.

I claim:

1. A polishing composition, comprising: from about 4 to 8% of solid polyethylene; from about .5 to 2% of oxidized microcrystalline wax; from about 12 to 22% of paraffin wax; and from about 70-81% of a hydrocarbon solvent, all said percentages being by weight of said composition, said composition being adapted to be applied to a surface such as a floor to form a hard, tough wear resistant film of high gloss.

2. A polishing composition, comprising: about 6% of solid polyethylene; about 1% of oxidized microcrystalline wax; about 16% of paraffin wax; and about 76% of a hydrocarbon solvent, all said percentages being by weight of said composition, said composition being adapted to be applied to a surface such as a floor to form a hard, tough wear resistant film of high gloss.

References Cited in the file of this patent
UNITED STATES PATENTS

| | | |
|---|---|---|
| 2,495,066 | Jones | Jan. 17, 1950 |
| 2,728,735 | Anderson | Dec. 27, 1955 |
| 2,733,225 | Smith | Jan. 31, 1956 |

FOREIGN PATENTS

| | | |
|---|---|---|
| 640,476 | Great Britain | July 19, 1950 |

OTHER REFERENCES

Warth: "The Chemistry and Technology of Waxes" (2nd Ed.), Reinhold Pub. Co. (1956), pages 708–724.